April 26, 1966  W. P. SIEGMUND  3,247,756
FIBER OPTICAL IMAGE TRANSFER DEVICE HAVING A MULTIPLICITY
OF LIGHT ABSORBING ELEMENTS
Filed May 16, 1961
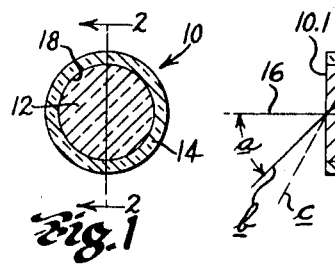
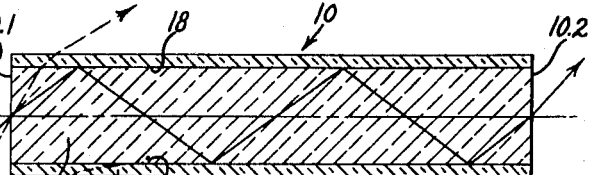
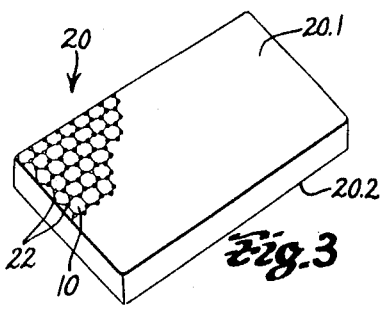
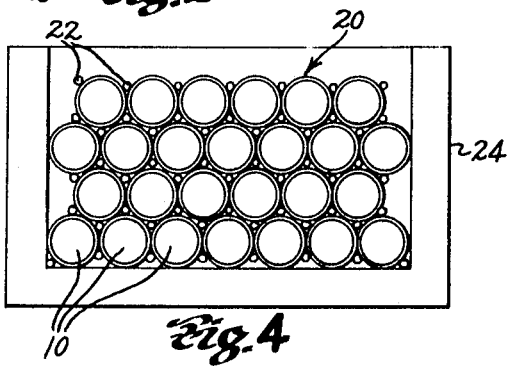
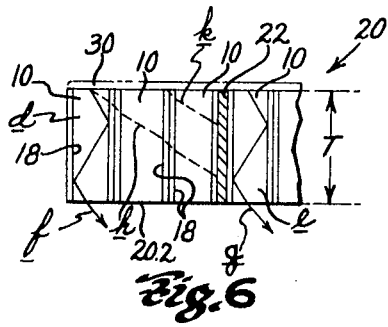
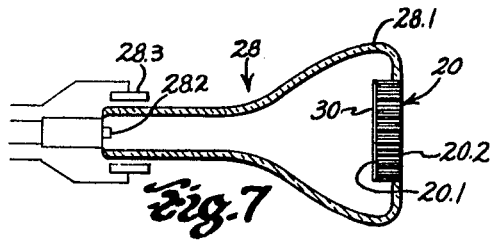
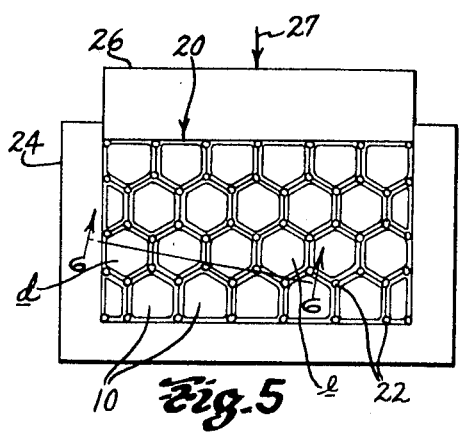
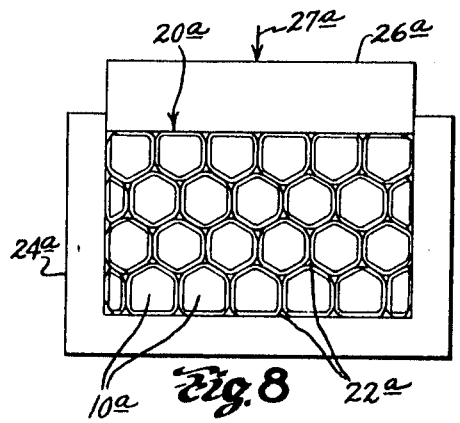
INVENTOR
WALTER P. SIEGMUND
BY Louis L. Gagnon
James P. McAndrews
ATTORNEYS

United States Patent Office 3,247,756
Patented Apr. 26, 1966

3,247,756
FIBER OPTICAL IMAGE TRANSFER DEVICE HAVING A MULTIPLICITY OF LIGHT ABSORBING ELEMENTS
Walter P. Siegmund, Woodstock, Conn., assignor to American Optical Company, Southbridge, Mass., a voluntary association of Massachusetts
Filed May 16, 1961, Ser. No. 110,506
4 Claims. (Cl. 88—1)

The field of this invention is that of image-transfer devices and the invention relates, more particularly, to novel and improved fiber optical image-transfer devices and to novel and improved methods for making such devices.

Conventional fiber optical image-transfer devices embody a multiplicity of fibers each of which has a core of a light-transmitting material of relatively high index of refraction and a cladding of a light-transmitting material of relatively low index of refraction, the fibers being fused in side-by-side parallel relation to form a vacuum-tight bundle in which corresponding ends of the fibers cooperate to define opposite end faces of the bundle. A light image can be formed upon one end face of such a fiber bundle so that light from segments of the image is received within respective fiber cores at one end and so that part of said light is conducted to the opposite ends of the fibers in accordance with well-known principles of total internal reflection for reproducing the light image in mosaic form on the opposite bundle end face. As is well known, each fiber core is adapted to conduct only light which enters the core within the light acceptance angle of the fiber, this light acceptance angle being a function of the difference in refractive index of the fiber core and cladding materials. Other light from the light image which enters the fiber cores at angles greater than the light acceptance angle of the fibers will tend to be transmitted through the fiber claddings to be scattered through other bundle fibers and may eventually reach the opposite bundle end face upon which the original light image is reproduced in mosaic form. In addition, some light from the original light image will enter the fiber claddings rather than the fiber cores directly at the bundle face where the light image is originally formed and this light will also tend to be scattered through the bundle fibers and may also reach the opposite bundle end face.

Light which is scattered through the fiber bundle and which eventually reaches the opposite end face of the bundle does not contribute to reproduction of the mosaic light image on said face but rather tends to wash out or reduce contrast between segments of the mosaic image which are reproduced by light conducted through the fiber cores. For this reason, many attempts have been made to provide light-conducting optical fibers with additional outer claddings of light-absorbing materials which are adapted to prevent transmission of unwanted light between adjacent bundle fibers. However, the outer fiber claddings intended for this purpose have been difficult to form upon the fibers and have tended to be of excessive thickness so that a high proportion of the volume of such a fiber bundle has been devoted to light-absorbing material which has not contributed to the transmission of image-reproducing light.

It is an object of this invention to provide a new and improved fiber optical image-transfer device; to provide such a device which is adapted to transfer an image with faithful reproduction of the contrast between light and dark segments of the image; to provide such an image-transfer device in which a substantial proportional of the volume of the device is occupied by fiber cores adapted to transmit image-forming light; to provide such a device in which device components are assembled in vacuum-tight relation; and to provide such a device which is of simple and inexpensive construction.

It is a further object of this invention to provide a fiber optical image-transfer device comprising a multiplicity of fibers each having a core of a light-transmitting material of relatively high index of refraction and a cladding of a light-transmitting material of relatively low index of refraction, said fibers being arranged in side-by-side parallel relation to form a bundle in which corresponding ends of the fibers cooperate to define opposite end faces of the bundle, and a multiplicity of light-absorbing elements, preferably separate light-absorbing elements, arranged within the bundle between the fibers, said elements being arranged so that a plurality of elements are adapted to cooperate to intercept and absorb light transmitted through the cladding of each fiber and so that each element is adapted to intercept and absorb light transmitted through the claddings of a plurality of fibers.

It is also an object of this invention to provide new and improved methods for making a fiber optical image-transfer device; to provide novel and improved methods for making an image transfer device which is adapted to transfer an image with faithful reproduction of the contrast between light and dark segments of the image; to provide such methods for making a fiber optical image-transfer device in which components of the device are secured together in vacuum-tight relation; and to provide such improved methods of device manufacture which can be simply and economically performed.

Other objects, advantages and details of the novel and improved device and methods of device manufacture provided by this invention appear in the following detailed description of preferred embodiments of the invention, the detailed description referring to the drawing in which:

FIG. 1 is an end view of a light-conducting optical fiber of the type to be incorporated in the image-transfer device provided by this invention;

FIG. 2 is a section view along line 2—2 of FIG. 1;

FIG. 3 is a perspective view of the fiber optical image-transfer device provided by this invention;

FIG. 4 is an enlarged end view of the device of FIG. 3 showing the device in a preliminary stage of manufacture;

FIG. 5 is an end view similar to FIG. 4 showing the device of FIG. 3 in a final stage of device manufacture;

FIG. 6 is a partial section view along line 6—6 of FIG. 5;

FIG. 7 is a diagrammatic view illustrating use of the device provided by the invention; and FIG. 8 is an end view similar to FIG. 5 of another alternative embodiment of this invention.

Referring to the drawings, 10 in FIGS. 1 and 2 indicates a light-conducting optical fiber which embodies a core 12 of a light-transmitting material of relatively high index of refraction and a cladding 14 of a light-transmitting material of relatively low index of refraction. Such fibers are well known in the fiber optical art and can be inexpensively manufactured by well-known techniques. When light is directed into the fiber at one end 10.1, light entering the fiber core 12 at an angle to the fiber axis 16 which is within what is called the light acceptance angle of the fiber can be refracted at the fiber end 10.1 and can be incident upon the interface 18 between the fiber core and cladding to be totally reflected from the interface. However, light which enters the fiber core 12 at an angle greater than the light acceptance angle of the fiber is transmitted through the interface 18 exteriorly of the fiber. For example, where the fiber core 12 is formed of flint glass or the like of 1.75 refractive index and the cladding 14 is formed of crown glass or the like of 1.52 refractive index, the fiber 10 will have a light acceptance angle $a$ of approximately 60° as governed largely by the difference in refractive index of the core and cladding materials in well-known manner. Thus, a ray of light $b$ entering the fiber at the acceptance angle $a$ as shown in FIG. 2 will be repeatedly reflected from the fiber interface 18 to be conducted to the opposite fiber end 10.2. Another ray of light $c$ entering the fiber at an angle greater than the light acceptance angle of the fiber will be transmitted through the fiber cladding exteriorly of the fiber.

According to this invention, a multiplicity of light-conducting fibers 10 are arranged in side-by-side, parallel relation as shown in FIGS. 3–6 to form a fiber optical image-transfer device 20, corresponding ends of the fibers cooperating to define opposite end faces 20.1 and 20.2 of the device. The fibers may be round in cross-section as shown or may be of square, hexagonal or other desired configuration within the scope of this invention but are preferably on the order of 50 microns or less in transverse dimension.

A multiplicity of light-absorbing elements 22 are also assembled within the bundle of optical fibers forming the device 20. For example, where the optical fibers embodied in the image-transfer device are initially round in cross-section as illustrated in FIG. 4, the light-absorbing elements can comprise thin filaments of a light-absorbing material such as metal or glass or the like, also round in cross-section, if desired, which are fitted within interstices of the fiber bundle, the optical fibers and light-absorbing filaments preferably being initially stacked within a channel-shaped receptacle 24, as shown, for defining part of the outer configuration of the device 20. Only a small number of fibers and light-absorbing elements are illustrated in FIGS. 4–6, these being drawn to scale much larger than their true size and also being shown in ideally uniform relation for convenience of illustration. A cover member 26 can then be fitted within the receptacle 24 for movement within the receptacle channel, as shown in FIG. 5, the receptacle and cover preferably being of a suitable refractory material. The refractory material utilized for the receptacle and cover is preferably selected from those well known in the fiber optical art which do not tend to stick to molten glass and the like and, if desired, the refractory members can be lined with gold foil or the like (not shown) in well-known manner for further preventing adhesion of the refractory members to molten glass and the like within the receptacle channel.

The light-conducting fibers 10 can be formed of flint and crown glasses as previously described, for example, and can be adapted to be fused together at a selected temperature, and the light-absorbing elements 22 can be formed of a metal or glass which is adapted to soften only at a much higher temperature. The light-absorbing elements 22 must be formed of a material which is adapted to be fused to the material embodied in the fiber claddings 14 in vacuum-tight relation, many such light-absorbing materials being generally available for meeting these requirements. For example, where the fibers 10 have coatings 14 of crown glass, as suggested, the elements 22 can be formed of a stainless steel such as that commercially known as Number 430 Stainless Steel or that known as Sylvania Number 4 Alloy. The assembled optical fibers and light-absorbing elements can be heated to the fusing temperature of the optical fibers below the softening temperature of the light-absorbing elements, and pressure can be applied to the receptacle cover 26 in the direction indicated by the arrow 27 for compressing and compacting the fibers and elements, whereby the claddings 14 of the fibers 10 will be fused to adjacent light-absorbing elements 22 and to the claddings of adjacent fibers 10 as shown in FIG. 5. As can be seen in FIG. 5, the light-absorbing elements 22 will retain their original configuration during the fusing process and will retain substantially their original positions relative to each other and to the optical fibers of the device during the fusing process. Further, since the light-absorbing elements 22 tend to fill interstices between the assembled bundle fibers 10, very little compaction or deformation of the optical fibers 10 will be required for compressing the fibers and elements together into vacuum-tight relation, whereby the optical fibers can retain substantially their original light-transmitting characteristics after fusing. The techniques for fusing optical fibers together are well known in the fiber optical art so that the fusing process will not be further described herein, it being understood that conventional fusing techniques are to be employed.

The image-transfer device 20 can then be removed from the receptacle 24 and the end faces 20.1 and 20.2 of the image-transfer device can be ground and polished in any conventional manner for optically finishing the ends of the fiber cores 12 and for rendering the ends of the fiber cores receptive to light.

An image-transfer device 20 prepared in the above-described manner can be employed as a faceplate in a cathode ray tube 28 for example, as is diagrammatically illustrated in FIG. 7, one end face 20.1 of the device being provided with a layer of phosphors 30. The image-transfer device which forms a vacuum-tight unit can be adapted to seal the cathode ray tube envelope 28.1 and can be positioned so that an electron beam emitted by an electron gun 28.2 embodied in the tube can be directed upon said phosphors 30 by the tube deflecting system 28.3, the phosphors 30 being adapted to fluoresce in response to incidence of the electron beam thereon for producing a light image upon the image-transfer device face 20.1 in conventional manner.

As can be seen particularly by reference to the section view of FIG. 6, in which light-transmitting materials have not been cross-hatched for clarity of illustration, the optical fibers 10 embodied in the device 20 are adapted to receive light from respective segments of the light image formed by the phosphors 30 upon the device face 20.1 and are adapted to conduct a representative part of this light to the opposite end face 20.2 of the device for reproducing the original light image in mosaic form on said opposite face. Where the fibers 10 are of small diameter or transverse dimension as previously suggested, the device 20 can be adapted to reproduce an image with a high degree of resolution as will be understood. Since the original light image formed upon the device face 20.1 will be delineated thereon by the contrast between relatively lighter and darker segments of the image, the fibers 10 will receive and conduct different but proportional amounts of light for maintaining said contrast between the image segments reproduced by the fibers upon the bundle face 20.2. For example, as shown in FIGS. 5 and 6, the optical fibers 10 designated $d$ and $e$ may receive light from relatively light and relatively dark segments respectively of an original light image formed upon the device face 20.1 by the phosphors 30. Each of these fibers will be adapted to conduct that light which enters the fibers at an angle within the light acceptance angle of the fibers in the manner previously described, thereby to reproduce said image segments with the same contrast upon the device face 20.2 as indicated in FIG. 6 by the light rays $f$ and $g$ respectively. However, light from an original image segment entering the fiber $d$ at an angle greater than the light acceptance angle of the fiber will be transmitted through the cladding of the fiber $d$ to be scattered through other bundle fibers as indicated in FIG. 6 by the light ray $h$. Similarly, light entering the device 20 at the face 20.1 directly through the claddings of the fibers embodied in the device will also tend to be scattered through device fibers as indicated in FIG. 6 by the light ray $k$. If this scattered or stray light were eventually to reach the bundle face 20.2 at the location of the fiber $e$ for example, this stray light would wash out or substantially reduce the desired contrast between the image segment reproduced by the fiber $e$ and the image segment reproduced by the fiber $d$ as will be understood. However, in the device of this invention, the light-absorbing elements 22 are positioned within the fiber bundle forming the image-transfer device 20 and these elements can be adapted to intercept and absorb substantially all stray light transmitted through the device outside the fiber cores 12 as illustrated in FIG. 6 by the light rays $h$ and $k$. Thus the fiber optical image-transfer device provided by this invention is adapted to reproduce or transfer a light image while maintaining true contrast between relatively light and dark segments of the image.

As will be understood, stray light such as that represented by the light rays $h$ and $k$ in FIG. 6 will be reflected and refracted at random throughout the image-transfer device 20 as the stray light impinges upon the interfaces 18 of the device fibers at various angles of incidence. Thus, a relatively small number of light-absorbing elements 22 of relatively small size can be interspersed throughout the fiber bundle but can be adapted to intercept and absorb a substantial part of said stray light before it reaches the device face 20.2. That is, although a relatively small number of light-absorbing elements may be dispersed throughout the bundle, these elements can be located so that it is highly probable that any stray light within the bundle will be intercepted by one or more of the elements. Of course, an image-transfer device can embody any desired number of high-absorbing elements, thereby to intercept and absorb stray light within the device to any desired extent within the scope of this invention. That is, the light-absorbing elements 22 can be arranged within a bundle of optical fibers to fill alternate interstices between the fibers or can be dispersed through the fiber bundle at even wider spacing, if desired. In this regard, it will be noted that the stray light transmitted within the fiber bundle will generally be transmitted in directions oblique to the device faces 20.1 and 20.2 so that, where the device thickness T is relatively large, the stray light must generally be transmitted over a relatively long path before reaching the device face 20.2. Accordingly, where the device 20 is relatively thick, a very few light-absorbing elements can be embodied in the device with the same probability for intercepting and absorbing stray light therein as would be the case with a greater number of light-absorbing elements in a relatively thinner device. Similarly, where the image-transfer device embodies fibers 10 having a relatively large light-acceptance angle, there will be less stray light transmitted between device fibers, and, accordingly, fewer light-absorbing elements will be required for reducing said stray light to a practical level.

The light-absorbing elements 22 embodied in the device 20 described with reference to FIGS. 3-6 have been suggested to comprise thin filaments of metal, glass or the like, but it should be understood that the light-absorbing elements can be provided in many different forms within the scope of this invention. Thus, flakes or particles of light-absorbing materials rather than light-absorbing filaments can be dispersed through the bundle of fibers forming the image-transfer device of this invention, the density of particle dispersion being selected so that stray light within the fiber bundle can be intercepted and absorbed by the particles to the desired extent before said stray light is able to reach the output image face of the device. Similarly, very thin patches or coatings of light-absorbing materails such as metal, glass or the like can be deposited in any conventional manner at intervals along the periphery of the light-conducting optical fibers embodied in the image-transfer device of this invention. Alternatively, thin, partially-absorbing coatings of metal, glass or the like can be formed upon the peripheries of the optical fibers embodied in an image-transfer device, whereby stray light transmitted through the fiber bundle can be adapted to impinge upon a series of said partially-absorbing coatings before said light is able to reach the output image face of the device and can be thereby completely or at least substantially absorbed to prevent reduction in contract of image segments reproduced on said output image face. This invention also includes any other similar arrangement of light-absorbing elements within a fiber optical image-transfer device wherein a plurality of light-absorbing elements are adapted to cooperate to intercept and absorb stray light originally entering the device through a single fiber and wherin each light-absorbing element is adapted to intercept and absorb light originally entering the device through a plurality of fibers. In such a construction, a very small proportion of the device volume can be devoted to light-absorbing material and can still be adapted to prevent stray light in the bundle from reducing contrast in the light image reproduced by the device. Further, since the light-absorbing elements tend to fill bundle interstices so that bundle fibers can be fused together with limited deformation, the optical fibers can maintain substantially their designed light-transmitting characteristics in the completed image-transfer device.

It should also be understood that although light-conducting fibers 10 have been described as the image-transmitting members of the image-transfer device 20 previously described, the image-transfer device of this invention could also embody multifibers in substitution for the fibers 10. That is, conventional multifiber units, each embodying a number of light-conducting fibers similar to the fiber 10 which have been preliminarily fused together in vacuum-tight relation by conventional techniques, could be employed in the manufacture of image-transfer devices within the scope of this invention as will be understood. Further, if desired, multifiber units can be preliminarily formed which embody a number of optical fibers 10 fused together with one or more light-absorbing elements 22, these multifibers then being assembled in side-by-side parallel relation with or without additional optical fibers or additional light-absorbing elements to form an image-transfer device of the character described.

A preferred embodiment of this invention is illustrated in FIG. 8. In this embodiment of the invention, a multiplicity of light-conducting fibers 10a and of light-absorbing filaments 22a are initially assembled within a receptacle 24a, and a cover 26a is placed over the assembled fibers and elements in the manner described with reference to FIG. 5, the receptacle and cover being of refractory material and being lined with a suitable foil for preventing adhesion of the refractory material to molten glass in the manner also previously described. The optical fibers 10a can be formed of the materials previously suggested which are adapted to be fused together at a selected temperature but the light-absorbing elements 22a are preferably formed of a metal or glass material which is adapted to soften at a temperature lower than said selected temperature. For example, the elements can embody any conventional light-absorbing glass having a relatively low softening temperature. The assembled fibers 10a and light-absorbing elements can then be disposed in a furnace (not shown) and can be heated to the fusing temperature of the optical fibers while, at the same time, pressure is applied to the cover 26a in the direction of the arrow 27a, whereby the optical fibers will be gradually compressed into fused relation to adjacent optical fibers within the receptacle. The light-absorbing elements 22a, being adapted to soften at a lower temperature than the optical fibers, will initially be deformed and will tend to spread out laterally to a limited extent between the optical fibers and will then be fused to the optical fibers as the fibers are elevated to their fusing temperature, the softening of the light-absorbing elements facilitating filling of the bundle interstices, thereby to aid in securing the fibers and elements in vacuum-tight relation. This fusing process can also be conducted according to conventional techniques and need not be further described herein. In this manner, the fiber optical image-transfer device 20a can be formed. The device can be removed from the receptacle 24a and the end faces of the device can then be optically finished in conventional manner. As will be understood, the image-transfer device 20a will be adapted to function in the manner previously described with reference to the device 20.

Although particular embodiments of the image-transfer device and methods of device manufacture provided by this invention have been described for the purposes of illustration, it should be understood that the invention includes all modifications and equivalents thereof which fall within the scope of the appended claims.

Having described my invention, I claim:

1. A fiber optical image-transfer device comprising a multiplicity of fibers each having a core of a light-transmitting material of relatively high index of refraction and a cladding of a light-transmitting material of relatively low index of refraction, said fibers being arranged in side-by-side parallel relation to each other to form a bundle in which corresponding ends of the fibers cooperate to define respective bundle end faces, said individual fiber cores being adapted to receive light therein at one end from respective segments of a light image formed on one of said faces and to conduct at least part of said light to the opposite ends thereof for reproducing said image in mosaic form on the other of said faces, said fibers each being fused directly to fibers adjacent thereto within said bundle around a substantial portion of the fiber periphery, and a multiplicity of light-absorbing elements interspersed between the bundle fibers in spaced relation to each other, said elements being fused to fibers adjacent thereto within the bundle between portions only of said fibers, said elements being arranged so that a plurality of the elements are adapted to cooperate to intercept and absorb light transmitted through the cladding of each fiber and so that each element is adapted to intercept and absorb light transmitted through the claddings of several fibers, thereby to absorb a substantial part of the light from said light image which is directed toward said other bundle face outside the fiber cores.

2. A fiber optical image-transfer device comprising a multiplicity of fibers each having a core of a light-transmitting material of relatively high index of refraction and a cladding of a light-transmitting material of relatively low index of refraction, said fibers being fused directly to each other in side-by-side parallel relation to form a bundle in which corresponding ends of the fibers cooperate to define respective bundle end faces, whereby, when a light image is formed upon one of said faces, individual fiber cores are adapted to receive light therein at one end from respective segments of the light image and to conduct at least part of said light to the opposite ends thereof for reproducing said image in mosaic form upon the other of said bundle faces, and a multiplicity of filaments of light-absorbing material disposed within and extending along interstices of said fiber bundle and fused to said bundle fibers between portions only of said fibers, said filaments being spaced so that a plurality of the filaments are adapted to cooperate to intercept and absorb light transmitted through the cladding of each fiber and so that each filament is adapted to intercept and absorb light transmitted through the claddings of several fibers, thereby to absorb a substantial part of the light from said light image which is directed toward said other bundle face outside the fiber cores.

3. A fiber optical image-transfer device comprising a multiplicity of fibers each having a core of a light-transmitting material of relatively high index of refraction and a cladding of a light-transmitting material of relatively low index of refraction, said fibers being arranged in side-by-side, parallel relation to form a bundle in which corresponding ends of the fibers cooperate to define respective bundle end faces, whereby when a light image is formed upon one of said faces, individual fiber cores are adapted to receive light therein at one end from respective segments of the light image and to conduct at least part of said light to the opposite ends thereof for reproducing said image in mosaic form upon the other of said bundle faces, and a multiplicity of light-absorbing filaments extending between said bundle faces between said fibers, said filaments being arranged so that a plurality of the elements are adapted to cooperate to intercept and absorb light transmitted through the cladding of each fiber and so that each element is adapted to intercept and absorb light transmitted through the claddings of several fibers to absorb a selected part of the light from said light image which is directed toward said other bundle face outside the fiber cores, said fibers being formed of materials having fusing temperatures substantially lower than the fusing temperature of the material embodied in said filaments, said fibers being fused in vacuum-tight relation directly to other fibers and filaments contiguous thereto within said bundle.

4. A fiber optical image-transfer device comprising a multiplicity of fibers each having a core of a light-transmitting material of relatively high index of refraction and a cladding of a light-transmitting material of relatively low index of refraction, said fibers being arranged in side-by-side, parallel relation to form a bundle in which corresponding ends of the fibers cooperate to define respective bundle end faces, whereby, when a light image is formed upon one of said faces, individual fiber cores are adapted to receive light therein at one end from respective segments of the light image and to conduct at least part of said light to the opposite ends thereof for reproducing said image in mosaic form upon the other of said bundle faces, and a multiplicity of light-absorbing filaments extending between said bundle faces between said fibers, said filaments being arranged so that a plurality of the elements are adapted to cooperate to intercept and absorb light transmitted through the cladding of each fiber and so that each element is adapted to intercept and absorb light transmitted through the claddings of several fibers to absorb a selected part of the light from said light image which is directed toward other bundle face outside the fiber cores, said fibers being formed of materials having fusing temperatures slightly higher than the fusing temperature of the material embodied in said filaments, said fibers and filaments being fused in vacuum-tight relation directly to other fibers and filaments contiguous thereto within said bundle.

References Cited by the Examiner

UNITED STATES PATENTS

| 2,825,260 | 3/1958 | O'Brien | 88—1 |
| 2,992,516 | 7/1961 | Norton | 49—79 |
| 3,060,789 | 10/1962 | Hicks | 88—1 |

OTHER REFERENCES

Davidson: "Space Redistribution of Optical Image With Light Conducting Fiber Bundle for Color TV Pickup Tube," RCA TN No. 136, March 1958.

Hopkins et al.: "Transparent Fibres for the Transmission of Optical Images," Optica ACTA vol. 1, No. 4, February 1955, pp. 164–170.

Morton et al.: "Image Intensifier," RCA TN No. 268, June 1959.

DAVID H. RUBIN, *Primary Examiner.*

WILLIAM MISIEK, JEWELL H. PEDERSEN,
*Examiners.*

JOHN K. CORBIN, *Assistant Examiner.*